May 7, 1935. H. M. HITCHINS 2,000,284

EGG PACKAGE

Filed Feb. 6, 1932 2 Sheets-Sheet 1

INVENTOR
HARRY M. HITCHINS
BY Reif & Braddock
ATTORNEYS

May 7, 1935.  H. M. HITCHINS  2,000,284
EGG PACKAGE
Filed Feb. 6, 1932   2 Sheets-Sheet 2
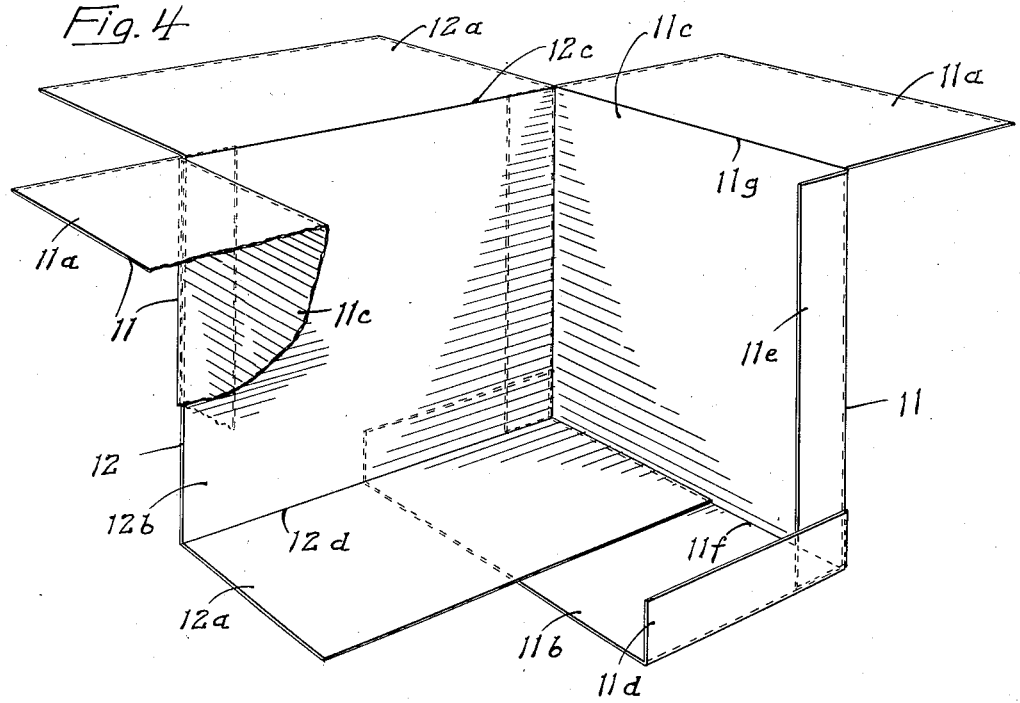
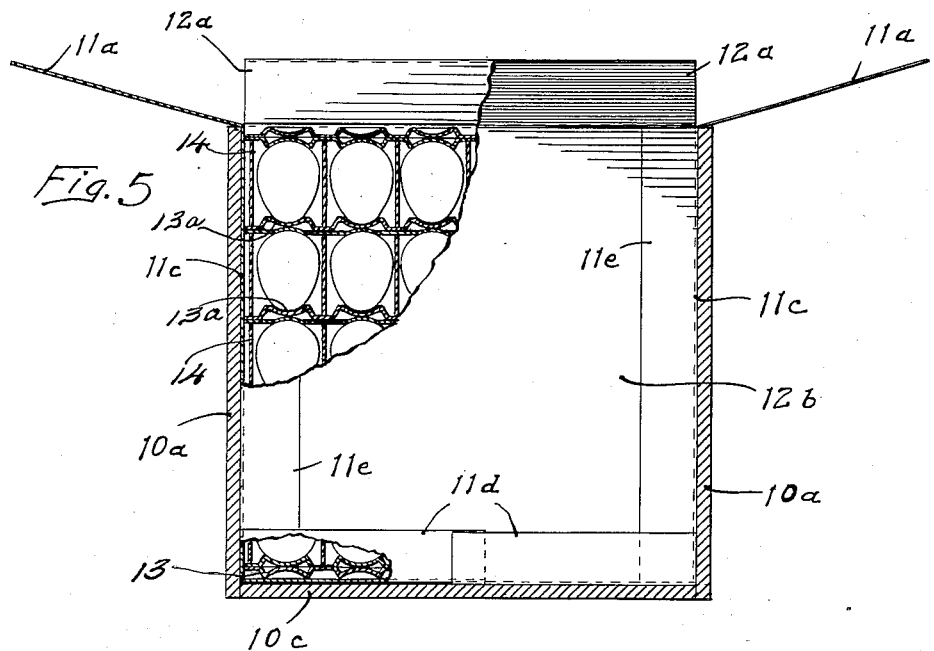
INVENTOR
HARRY M. HITCHINS
BY Reif & Braddock
ATTORNEYS Patented May 7, 1935

2,000,284

UNITED STATES PATENT OFFICE 2,000,284

EGG PACKAGE

Harry M. Hitchins, Minneapolis, Minn.

Application February 6, 1932, Serial No. 591,336

4 Claims. (Cl. 217—3)

This invention relates to a package for eggs and the method of making the same. It has been the common practice for some years to pack eggs in wooden or metal crates which usually have two compartments therein, which compartments are of equal size and in which the eggs are disposed in layers, a cardboard separator being disposed at the bottom and top of the eggs in each compartment and between the various layers thereof, the eggs in the respective layers being separated by cardboard members known as fillers. Eggs are now placed in storage in the productive season in immense numbers, and the eggs are withdrawn from storage during the winter or unproductive season and placed on the market. It has been found that eggs thus placed in storage packed in the usual way, lose a considerable amount of moisture and weight during the storage period and furthermore, acquire an objectionable taste and odor. Furthermore, it is more or less common for eggs to be broken and in the ordinary method of packing a few broken eggs in one layer will be distributed throughout a great portion of the compartment, resulting in a moldy condition and the spoiling of the eggs in the entire compartment.

It is an object of this invention, therefore, to provide a simple and efficient method and package by means of which the eggs will be kept from losing any appreciable moisture and weight and will at the same time be kept in a fresh and pleasant condition of taste and odor. The eggs will be kept in good condition and should some of the eggs in any one layer be broken, the broken eggs will be closely confined and cannot contaminate the eggs in adjacent layers.

It is more specifically an object of the invention to provide a package and method of forming the same, which package comprises separate sheets of air and moisture proof paper of a size and shape to fit along the sides of an egg compartment, the edges of said sheets being disposed in overlapping relation, and certain portions of said sheets extending across the bottom of said compartment. The layers of eggs are placed within the sheets with the fillers and separators therefor, and when the compartment is filled, the tops of said sheets are folded over the top of the material in the compartment, whereby a substantially waterproof envelope is provided. Preferably a sheet of paper impervious to air and moisture is placed over the top of each layer of eggs in the compartment, the same engaging the tops of the eggs.

These and other objects and advantages of the invention will be fully set forth in the following description made in connection with the accompanying drawings, in which like reference characters refer to similar parts throughout the several views and in which:—

Fig. 4 is a perspective view showing the arrangement of the sheets of paper when placed in the egg compartment; and Fig. 5 is a view in vertical section on line 5—5 of Fig 1, certain parts being broken away.

Figure 2:
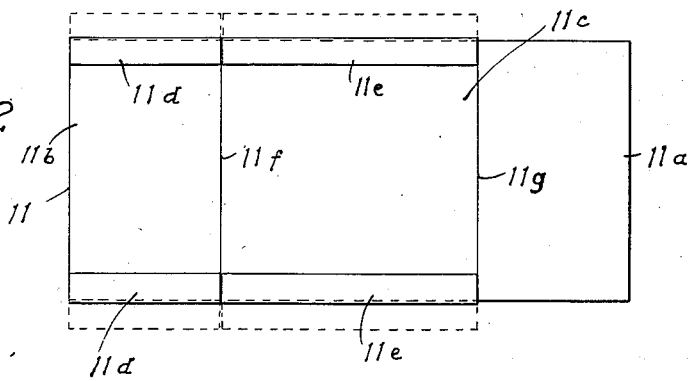
Fig. 2 is a plan view of a sheet of paper used.
Figure 3:
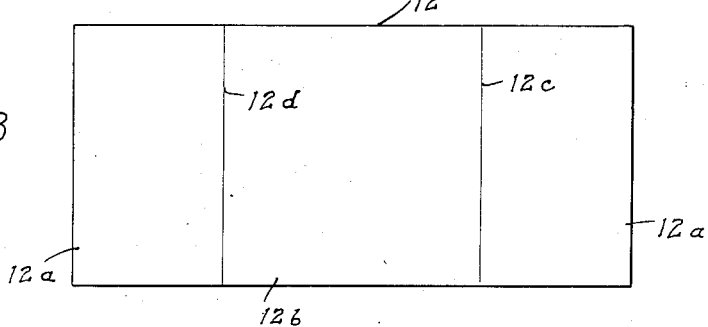
Fig. 3 is a plan view of another sheet of paper used.

Referring to the drawings, an egg crate of standard form is shown as 10, having the vertical sides 10a and the vertical end portions 10b as well as the bottom 10c, with a dividing partition 10d. Two compartments are thus formed in the crate, the same being of the same or equal size. In practicing the method of the invention and forming the package thereof, two sheets of air and moisture-proof paper 11 such as shown in Fig. 2 are provided. These sheets have the rectangular portions 11a and 11b at the ends and a central square or rectangular portion 11c. The portions 11b and 11c have strips or zones 11d and 11e extending along the sides thereof respectively, these portions in Fig. 2 being shown as folded down on the surfaces of portions 11b and 11c. The dotted lines at the sides of Fig. 2 show the strips of the zones 11d and 11e folded out flat so as to lie in the same plane as the remainder of sheet 11. The end zone 11a is folded along a line 11g downward as seen in Fig. 2 and the end zone 11b is folded upwardly as shown in Fig. 2 along the line 11f. Two sheets of air and moisture-proof paper 12 such as shown in Fig. 3 are provided. These sheets are of rectangular shape as shown and are folded into the end zones 12a which are of equal size and the central zone 12b. One zone 12a is folded along the line 12c in one direction and the other end zone is folded along the line 12d in the opposite direction.

Figure 1:
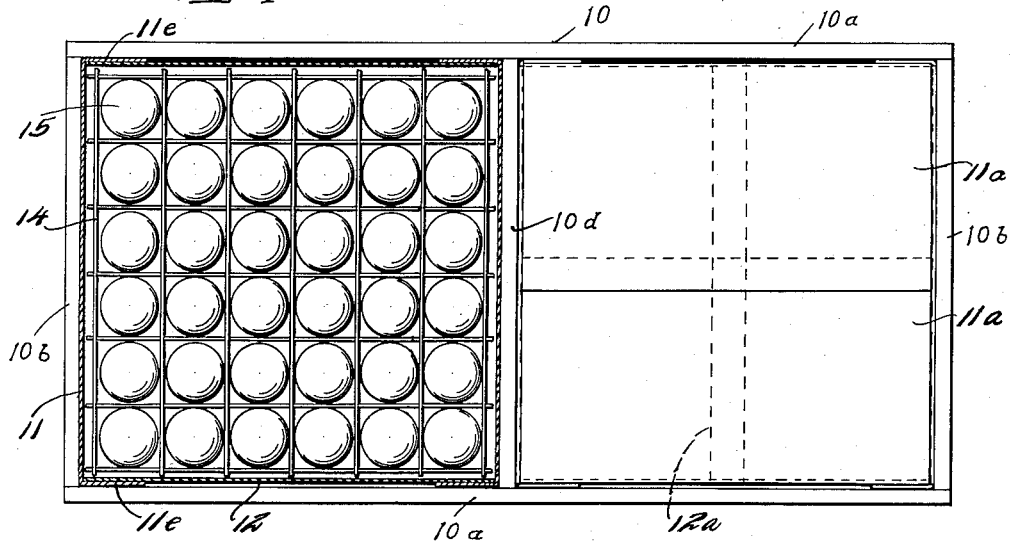
Fig. 1 is a view partly in plan of a filled crate of eggs with the cover off, and partly in horizontal section, taken substantially on line 1—1 of Fig. 5.

When the eggs are to be placed in the compartment of the crate, the sheets 11 are placed in the compartment as shown in Fig. 4. The portions 11b are placed on the bottom of the compartment. The portions 11c extend vertically along opposite sides of the compartment and the portions 11a extend outward over the top edges of the crate. The sheets 11 are quickly placed in the crate and the sheets 12 are then placed as shown in Fig. 4. One portion 12a extends along the bottom of the compartment, being superposed upon the portions 11b of the sheets 11. The side strips 11d and 11e of the sheet 11 are folded upwardly at right angles respectively to portions 11b and 11c and the portion 12b of sheet 12 extends along within the side strips 11d and 11e. These side strips 11d and 11e thus extend in a vertical plane along opposite sides of the compartment and overlap the outer sides of the portions 12b. It will also be apparent that the side strips 11d and 11e overlap each other at the bottom corners of the compartment. It will be understood that there is one of the sheets 12 in each side of the compartment. Only one of these is shown in Fig. 4, in order to avoid confusion. It will also be noted, as clearly shown in Fig. 5, that the portions 11b and 11d of the sheets 11 overlap somewhat as shown at 11g in Fig. 5. It will also be noted that there is no open crack at any corner of the compartment, the sheets 11 and 12 thus overlapping to prevent any crack or opening. When the sheets 11 and 12 are disposed in the compartment, a separator or mape 13 is disposed in the bottom of the compartment within the sheets 11 and 12 and between the portions 12b and 11c thereof. One common form of these separators has cup-like portions 13a formed therein in intersecting rows. One of these may be placed in inverted position at the bottom of the compartment and another one placed with the concave portion of the cups uppermost, immediately on top of this inverted separator. A filler 14 is then placed on the uppermost separator. These fillers are made of thin cardboard and comprise strips of such cardboard slotted to be connected to form a cellular structure having compartments rectangular in horizontal cross section and open at their upper and lower ends. The eggs 15 are then placed in such compartments to form one layer. A sheet of paper 16 impervious to air and moisture is then placed over the layer of eggs in engagement with the tops of the eggs. It will be noted that the eggs are placed large end uppermost. Another separator or mape 13 is now placed over the sheet 16, another filler is placed on the separator or mape, and another layer of eggs placed in position. This arrangement is continued until the compartment is filled. A separator 13 is placed over the sheets 16 in the top layer, this separator being also in inverted position so that the concave portions of the cups fit over the tops of the eggs in the topmost layer. Another separator 13 is then placed at the top of the compartment so that there are thus two separators in opposed relation, both at the top and bottom of the compartment. When the compartment is thus filled, the portions 12a of sheet 12 are folded inwardly and downwardly so as to lie in horizontal position over the top of the topmost separator 13. The end portions 11a of sheets 11 are then folded inwardly and downwardly so as to overlie the portions 12a as shown in Fig. 1. The portions 12a are of sufficient width to overlap slightly and the portions 11a are also of sufficient width to overlap slightly. The sheets 11 and 12 thus act to form a substantially tight closure about the material in one compartment. The separators 13 cause the sheets 12 to be pressed out against the side strips 11e and 11d and there is practically no chance for leakage of air or moisture from the interior of the compartment wherein eggs are disposed. These sheets 16 also tend to prevent any escape of moisture and any circulation of air.

The present application is an improvement upon the package and method disclosed and claimed in applicant's Patent No. 1,792,303, which patent discloses the feature of having a sack made to extend about the layers of the eggs and the sheets of air and moisture proof paper disposed therebetween. It has been found in practice to be quite difficult to make such a sack. The air and moisture proof paper does not lend itself to the application of adhesive and it was necessary to pass the superposed sheets of paper between hot rollers in order to cause them to adhere. The sack is thus expensive and difficult to make and in placing the eggs in the compartment, the sack was often torn. The materials used in the present method and package are easily and quickly made by any paper manufacturing company and the same can be easily and quickly placed in position in the crate. When in position, they form, as stated, a closure which is for practical purposes substantially air and moisture tight.

From the above description it is seen that applicant has provided a simple and improved package and method of making the same. The package has been demonstrated in actual practice and found to be quite successful and remarkable in performance. Eggs have been stored and found to have a fresh and unobjectionable taste when used. The amount of shrinkage or evaporation is also quite small. The sheets of paper, as above stated, can be easily and quickly handled and the packer soon becomes quite rapid and proficient in placing the same in the crate and disposing the eggs as well as the separators and fillers therein. The sheets of paper are much more easily and quickly handled than a paper bag or sack adapted to fit the crate. The package and method thus have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What I claim is:

1. A package for eggs having a compartment rectangular in horizontal and vertical cross section, comprising a lining formed of a pair of sheets of material impervious to air and moisture and having portions extending over and substantially fitting opposite vertical walls respectively of said compartment and portions extending across the bottom of said compartment between the walls thereof but shorter than the entire dimension across said bottom, a pair of sheets of similar material having portions extending over and substantially fitting the other vertical walls respectively of said compartment, said latter portions having comparatively narrow flanges along the vertical sides thereof which overlap the first mentioned portions of said first mentioned sheets, said second pair of sheets also having portions extending over the bottom of said compartment between the walls thereof but shorter than the entire dimension across said bottom, said portions of said sheets extending over said bottom overlapping so as to completely cover said bottom and both pairs of sheets having top portions foldable over the top of said compartment so as to completely cover the same.

2. The structure set forth in claim 1, said portions of said second pair of sheets which extend over the said bottom also having comparatively narrow flanges along their opposite sides which extend vertically and overlap the first mentioned portions of said first mentioned pair of sheets.

3. A package for eggs having a compartment substantially rectangular in horizontal and vertical cross section comprising a lining formed of a pair of sheets of material impervious to air and moisture and having portions extending over and substantially fitting opposite vertical walls respectively of said compartment and portions extending across the bottom of said compartment but shorter than the entire dimension across said bottom, a pair of sheets of similar material having portions extending over and substantially fitting the other vertical walls respectively of said compartment, said latter portions having comparatively narrow flanges along the vertical sides thereof which overlap the first mentioned portions of said first mentioned sheets, said second pair of sheets also having portions extending over the bottom of said compartment between the walls thereof but shorter than the entire dimension across said bottom, said portions of said sheets extending over said bottom overlapping so as to completely cover said bottom, layers of egg separating means within said lining adapted to contain eggs, a sheet of material impervious to air and moisture between each layer of said egg separating means, both pairs of said sheets having top portions foldable over the top of said compartment so as to completely cover the same.

4. A package for eggs comprising a compartment rectangular in horizontal and vertical cross-section, a liner having portions extending over the end and side walls of said compartment, said portions having separate parts at their bottom extending at an angle thereto and partially across the bottom of said compartment between the walls thereof respectively, said parts being proportioned in their dimensions so as to cover the entire area of said bottom and being shorter than the entire dimensions of said bottom, said liner also having top portions whereby said liner may be drawn upwardly out of said compartment by said top portion with the eggs remaining in said compartment.

HARRY M. HITCHINS.